(12) United States Patent
Gallagher et al.

(10) Patent No.: US 7,684,642 B2
(45) Date of Patent: Mar. 23, 2010

(54) CORRECTION OF REDEYE DEFECTS IN IMAGES OF HUMANS

(75) Inventors: Andrew C. Gallagher, Brockport, NY (US); Jay S. Schildkraut, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 1601 days.

(21) Appl. No.: 10/792,079

(22) Filed: Mar. 3, 2004

(65) Prior Publication Data
US 2005/0196067 A1 Sep. 8, 2005

(51) Int. Cl.
G06K 9/00 (2006.01)
G06K 9/40 (2006.01)
G06K 9/42 (2006.01)
G06K 9/44 (2006.01)

(52) U.S. Cl. .................. 382/275; 382/117; 382/167; 382/257

(58) Field of Classification Search ............... 382/275, 382/167, 257, 117
See application file for complete search history.

(56) References Cited

U.S. PATENT DOCUMENTS

| | | | |
|---|---|---|---|
| 5,432,863 A | 7/1995 | Benati et al. | |
| 5,748,764 A * | 5/1998 | Benati et al. | 382/117 |
| 5,781,650 A | 7/1998 | Lobo et al. | |
| 6,252,976 B1 | 6/2001 | Schildkraut et al. | |
| 6,285,410 B1 | 9/2001 | Marni | |
| 6,292,574 B1 | 9/2001 | Schildkraut et al. | |
| 6,631,208 B1 | 10/2003 | Kinjo et al. | |
| 2002/0126893 A1 * | 9/2002 | Held et al. | 382/167 |
| 2003/0007687 A1 | 1/2003 | Nesterov et al. | |
| 2004/0037460 A1 * | 2/2004 | Luo et al. | 382/165 |
| 2004/0228542 A1 * | 11/2004 | Zhang et al. | 382/275 |
| 2005/0031224 A1 * | 2/2005 | Prilutsky et al. | 382/275 |

(Continued)

FOREIGN PATENT DOCUMENTS

EP 1 530 158 A2 5/2005

(Continued)

OTHER PUBLICATIONS

Jay S. Schildkraut et al., "A Fully Automatic Redeye Detection and Correction Algorithm" Proceedings 2002 International Conference of Image Processing. ICIP 2002. Rochester, NY, Sep. 22-25, 2002, International Conference on Image Processing, New York, NY: IEEE, US, vol. 2 of 3, Sep. 22, 2002, pp. 801-803, XP010607445 ISBN: 0-7803-7622-6 Chapter 1. "Introduction".

(Continued)

Primary Examiner—Bhavesh M Mehta
Assistant Examiner—Bernard Krasnic
(74) Attorney, Agent, or Firm—Robert L. Walker (57) ABSTRACT

In a method and system for correcting redeye in a digital image of a human, a defect pair separation is measured. The members of the defect pair are each redeye defects in the image. Each defect has one or more pixels. The defects are adjusted, that is, retained unchanged or reduced in size to provide adjusted defects. The adjustment can follow growth of initial seed defects. The adjustment is responsive to the defect pair separation and can include trimming of pixels beyond a size limit calculated using the defect pair separation. Following the adjustment, the color of the adjusted defects is changed to reduce redeye.

17 Claims, 4 Drawing Sheets

U.S. PATENT DOCUMENTS

2005/0047656 A1* 3/2005 Luo et al. .................. 382/167
2007/0116380 A1* 5/2007 Ciuc et al. .................. 382/275

FOREIGN PATENT DOCUMENTS

GB 2385736 A * 8/2003

OTHER PUBLICATIONS

PCT-WO 99/17254, Apr. 8, 1999, "Digital Redeye Removal", Polaroid Corporation, Ronald E. Boucher et al.

British Machine Vision Conference, "Estimating 3D Facial Pose Using The EM Algorithm", Kwang Nam Choi, Marco Carassoni and Edwin R. Hancock, Department of Computer Science, University of York, York, Y010 5DD, UK, pp. 84-93, (Year: 1998).

A Modular Procedure for Automatic Redeye Correction in Digital Photos, Raimondo Schettini, Rancesca Gasparini, Fadi Chazli, XP008066635, Proc. of SPIE-IS&T Electronic Imaging, SPIE vol. 5293, pp. 139-147, (Year: 2004).

Towards Automatic Redeye Effect Removal, B. Smolka, K. Dzubin, J.Y. Hardebreg, K.N. Plataniotis, M. Szezepanski, K. Wojciechowski, Pattern Recognition Letters 24 (2003) 1767-1785.

* cited by examiner

CORRECTION OF REDEYE DEFECTS IN IMAGES OF HUMANS

FIELD OF THE INVENTION

The invention relates to image processing and more particularly relates to correction of redeye defects in images of humans.

BACKGROUND OF THE INVENTION

When flash illumination is used to photograph humans, the pupils of the humans sometimes appear red. This phenomena is called "redeye" and reduces the quality of an image. Redeye is caused by red light reflecting off of the eye's retina and then exiting the eye through the pupil and returning to the camera.

Many algorithms have been proposed to correct redeye, with the goal of generating an improved image where the pupils appear natural. In some cases, an operator manually paints the redeye portion of a photographic print with a black marker. While this method is effective, it is clearly labor-intensive and not suited for high speed photofinishing or for digital systems where images are viewed on monitors or projected onto screens.

The detection of redeye can be either manual (i.e. with human intervention) or automatic (without human intervention). In either case, the detected redeye defects must undergo a correction to improve the image quality. There are primarily two aspects to the correction. The first is determining precisely which image pixels need to undergo color modification. The second is to determine the process by which the color of those pixels will be modified to improve the image. Errors in either aspect can produce objectionable corrections in a processed image.

In U.S. Pat. No. 5,432,863, the color of the affected pixels is modified by desaturating the redeye pixels and reducing the pixel lightness. However this correction is incomplete because the saturation and lightness of a redeye affected pixel are not independent. As a result, redeye defects corrected with this method sometimes appear too light or too dark. In addition, this method has the disadvantage that glint pixels must be separately identified and corrected.

In PCT patent publication WO 9917254, the color of a redeye affected pixel is replaced with a value based on a weighted function of the minimum of the R, G, and B color components. This method can also result in a non-optimal redeye correction since the green channel can have some sensitivity to the red light reflecting from a human eye. This method allows the possibility that the corrected region may appear noisy due to the fact that the correction may be switching based on the color component value that happens to be a pixel's minimum.

It is often the case that the boundary of a redeye defect is not well defined. For this reason, it is easy for an automatic algorithm to mistakenly either miss pixels that should be considered redeye or include pixels that are not really redeye when determining the redeye defect pixels. When coupled with defect correction, these misclassifications can produce objectionable artifacts. An under-correction occurs when some redeye pixels are correctly identified and color corrected, but others are not. As a result, a portion of the human subject's pupil can still appear objectionably red. An over-correction occurs when non-redeye pixels are mistakenly considered to be redeye, and the color modification is applied. As a result, a non-pupil portion of the human's face (e.g. the eyelid) can be modified by the color correction normally applied to redeye pixels, resulting in a very objectionable artifact.

Finally, some kind of blending is generally required in order to blend the corrected pixels with neighboring pixels of the original image without producing unnatural harsh edges. For example, in U.S. patent application Publication No. 2003/0007687A1 there is described using a blending filter. However, if the blending filter is of uniform size for all images, then some (e.g. small) human faces having redeye defects may appear to be over smoothed, causing objectionable blurriness. Meanwhile other human faces (e.g. large) human faces may appear to be not blurred enough. In U.S. patent application Publication No. 2003/0007687A1, there is described an operator control for controlling the level of blending. While this may be effective, it is not efficient to require an operator to make this adjustment for optimal results.

It would thus be desirable to provide methods, products, and systems redeye correction that deals with overcorrection and undercorrection and can, optionally provide blending.

SUMMARY OF THE INVENTION

The invention is defined by the claims. The invention, in broader aspects, provides a method and system for correcting redeye in a digital image of a human, in which a defect pair separation is measured. The members of the defect pair are each redeye defects in the image. Each defect has one or more pixels. The defects are adjusted, that is, retained unchanged or reduced in size to provide adjusted defects. The adjustment can follow growth of initial seed defects. The adjustment is responsive to the defect pair separation and can include trimming of pixels beyond a size limit calculated using the defect pair separation. Following the adjustment, the color of the adjusted defects is changed to reduce redeye.

It is an advantage of the present invention that methods, products, and systems are provided that give redeye correction, which deals with overcorrection and undercorrection and can, optionally provide blending.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

In the following description, some embodiments of the present invention will be described as software programs. Those skilled in the art will readily recognize that the equivalent of such software may also be constructed in hardware.

Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components, and elements known in the art. Given the description as set forth in the following specification, all software implementation thereof is conventional and within the ordinary skill in such arts.

Figure 1:
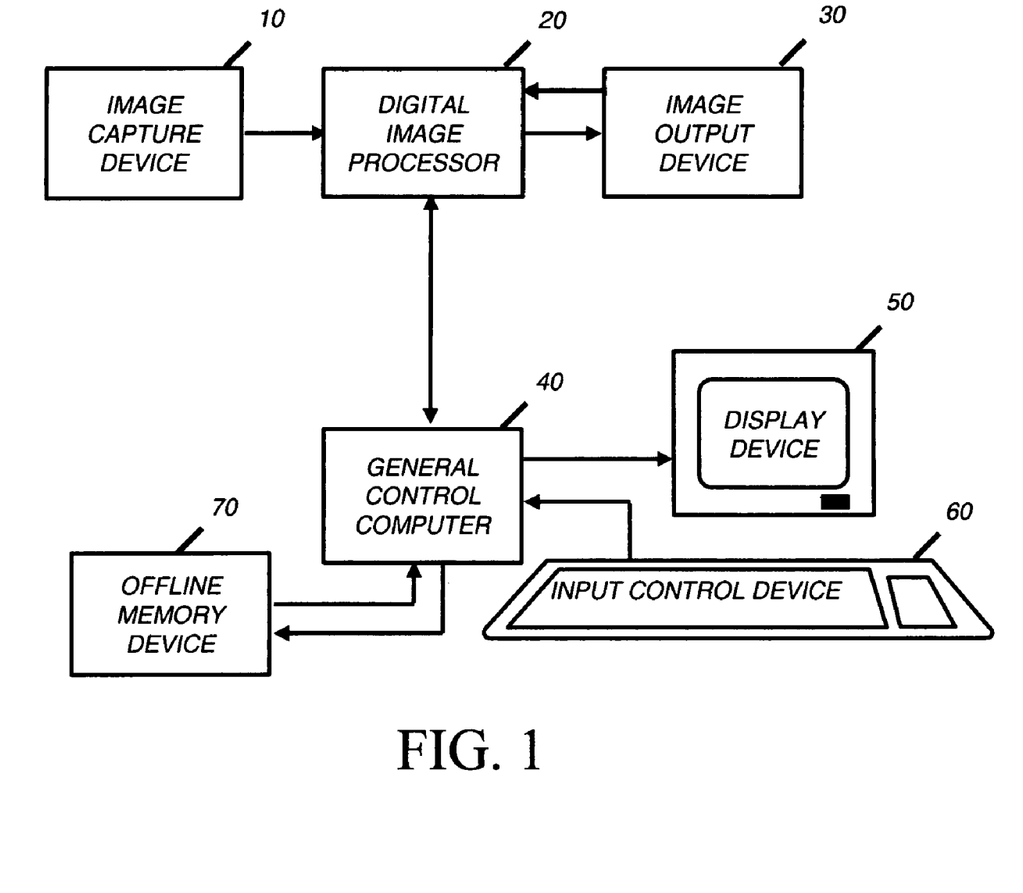
FIG. 1 is a block diagram of a computer system suitable for practicing the present invention.

The present invention may be implemented in computer hardware. Referring to FIG. 1, the following description relates to a digital imaging system which includes an image capture device 10, a digital image processor 20, an image output device 30, and a general control computer 40. The system can include a operator-use display device 50 such as a computer console or paper printer. The system can also include an input control device 60 for an operator such as a keyboard and or mouse pointer.

The output device provides a final image that has been subject to the redeye correction. The output device can be a printer or other output device that provides a paper or other hard copy final image. The output device can also be an output device that provides the final image as a digital file. The output device can also includes combinations of output, such as a printed image and a digital file on a memory unit, such as a CD or DVD.

The present invention can be used on multiple capture devices 10 that produce digital images. For example, FIG. 1 can represent a digital photofinishing system where the image capture device 10 is a conventional photographic film camera for capturing a scene on color negative or reversal film, and a film scanner device for scanning the developed image on the film and producing a digital image.

The capture device can also be an electronic capture unit (not shown) having an electronic imager, such as a charge coupled device or CMOS imager. The electronic capture unit can have an analog-to-digital converter/amplifier that receives the signal from the electronic imager, amplifies and converts the signal to digital form, and transmits the image signal to the digital image processor 20.

The digital image processor 20 provides the means for processing the digital images to produce pleasing looking images on the intended output device or media. The present invention can be used with a variety of output devices 30 that can include, but are not limited to, a digital photographic printer and soft copy display. The digital image processor 20 can be used to process digital images to make adjustments for overall brightness, tone scale, image structure, etc. of digital images in a manner such that a pleasing looking image is produced by an image output device 30. Those skilled in the art will recognize that the present invention is not limited to just these mentioned image processing functions.

The general control computer 40 shown in FIG. 1 can store the present invention as a computer program product having a program stored in a computer readable storage medium, which may include, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM). The associated computer program implementation of the present invention may also be stored on any other physical device or medium employed to store a computer program indicated by offline memory device 70.

Before describing the present invention, it facilitates understanding to note that the present invention is preferably utilized on any well-known computer system, such as a personal computer.

It should also be noted that the present invention can be implemented in a combination of software and/or hardware and is not limited to devices which are physically connected and/or located within the same physical location. One or more of the devices illustrated in FIG. 1 may be located remotely and can be connected via a network. One or more of the devices can be connected wirelessly, such as by a radio-frequency link, either directly or via a network.

The present invention may be employed in a variety of user contexts and environments. Exemplary contexts and environments include, without limitation, wholesale digital photofinishing (which involves exemplary process steps or stages such as film in, digital processing, prints out), retail digital photofinishing (film in, digital processing, prints out), home printing (home scanned film or digital images, digital processing, prints out), desktop software (software that applies algorithms to digital prints to make them better—or even just to change them), digital fulfillment (digital images in—from media or over the web, digital processing, with images out—in digital form on media, digital form over the web, or printed on hard-copy prints), kiosks (digital or scanned input, digital processing, digital or hard copy output), mobile devices (e.g., PDA or cellphone that can be used as a processing unit, a display unit, or a unit to give processing instructions), and as a service offered via the World Wide Web.

In each case, the invention may stand alone or may be a component of a larger system solution. Furthermore, human interfaces, e.g., the scanning or input, the digital processing, the display to a user (if needed), the input of user requests or processing instructions (if needed), the output, can each be on the same or different devices and physical locations, and communication between the devices and locations can be via public or private network connections, or media based communication. Where consistent with the foregoing disclosure of the present invention, the method of the invention can be fully automatic, may have user input (be fully or partially manual), may have user or operator review to accept/reject the result, or may be assisted by metadata (metadata that may be user supplied, supplied by a measuring device (e.g. in a camera), or determined by an algorithm). Moreover, the algorithm(s) may interface with a variety of workflow user interface schemes.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art.

A digital image includes one or more digital image channels or color components. Each digital image channel is a two-dimensional array of pixels. Each pixel value relates to the amount of light received by the imaging capture device at the physical region of the pixel. For color imaging applications, a digital image will often consist of red, green, and blue digital image channels. Motion imaging applications can be considered a sequence of digital images and can be processed as individual images or by processing a first image in a particular sequence and estimating changes necessary for succeeding images. Those skilled in the art will recognize that the present invention can be applied to, but is not limited to, a digital image channel for any of the above mentioned applications. Although a digital image channel is described as a two dimensional array of pixel values arranged by rows and columns, those skilled in the art will recognize that the present invention can be applied to non-rectilinear arrays with equal effect. Those skilled in the art will also recognize that for digital image processing steps described hereinbelow as replacing original pixel values with processed pixel values is functionally equivalent to describing the same processing steps as generating a new digital image with the processed pixel values while retaining the original pixel values.

Figure 2:
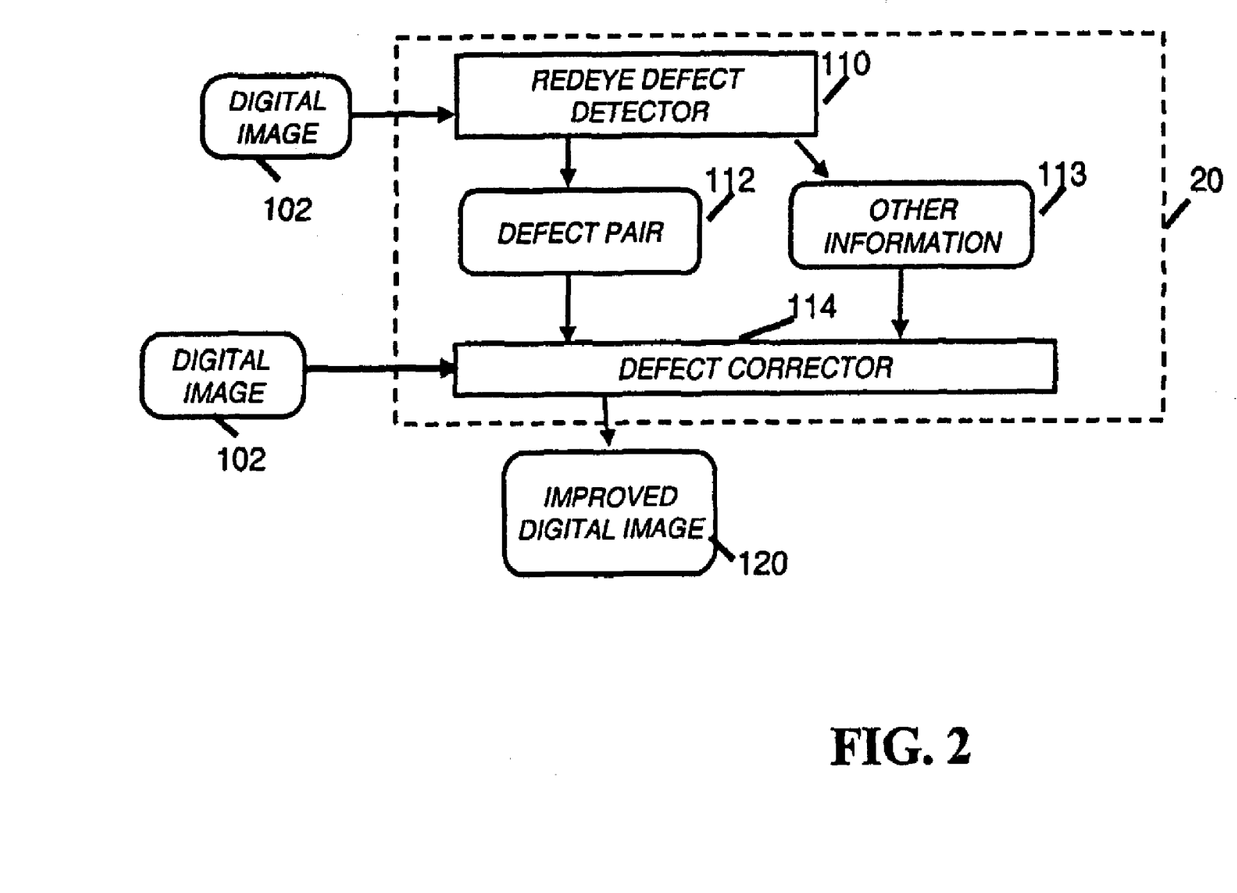
FIG. 2 is a block diagram of the digital image processor of FIG. 1 according to the present invention.

The digital image processor 20 shown in FIG. 1 is programmed to perform the method of the present invention as illustrated in more detail in FIG. 2. An original digital image 102 can be received from the image capture device (shown in FIG. 1) in a variety of different color representations. In a convenient embodiment, the original digital image is a color digital image with red, green, and blue digital image channels. The pixel values of the original digital image are related to the log of the scene intensity and each pixel value of each color channel is represented as a 12-bit value 0 to 4095. Every 188 code values represents a doubling of scene intensity (i.e. a photographic stop). For example, a first pixel having a value of 1688 represents a scene intensity that is twice as great as a second pixel having a value of 1500.

The present invention can operate successfully with other encodings, although modification to equation constants and shapes of functions may be required.

The digital image 102 is input to the digital image processor 20 for redeye detection and correction. FIG. 2 is a block diagram of the digital image processor 20. The digital image 102 is input to the redeye defect detector 110 for detection of the objectionable redeye defect. The redeye defect detector 110 outputs a redeye defect pair 112. Each defect pair 112 has a left member and a right member. (The terms "left" and "right" are used as a convenience and refer to the left and right eyes of an imaged person. The redeye defect detector 110 can be configured to provide eye detection irrespective of head orientation within an image or can be limited to particular head orientations, as desired.) During the method, as the members of the defect pair 112 are better and better defined, the terminology used to describe the members is changed. For example, "seed defects" are replaced by "grown defects". This reflects changes in the pixel locations defined as being within the respective defects. In all cases, the term "defect pair" remains applicable.

The redeye defect detector 110 can detect a single defect pair in an image or multiple defect pairs. If desired, the redeye defect detector 110 can also provide an indication that no redeye defect was detected or that a redeye defect was detected at only a single position. In the latter case, the indication can alert an operator to provide a manual inspection or can proceed by applying a defect corrector that corrects a single defect (rather than a defect pair 112).

The redeye defect detector 110 can be any of those known in the art. A currently preferred redeye defect detector 110 is described in U.S. Pat. No. 6,292,574 to Schildkraut et al., which is hereby incorporated herein by reference. Briefly summarized, with the redeye defect detector 110 of Schildkraut et al., skin regions of the digital image are identified based on color and shape and resized for analysis. Each skin region is searched for pairs of small red candidate defects. Various scores are analyzed (for example, symmetry, score with respect to matching an eye template, and so on) and a final classification is performed indicating the position of likely redeye defect pairs 112 in an image. The redeye defect detector 110 can internally scale the size of the digital image 102 by interpolation to normalize the analysis image size or to normalize the size of faces or skin regions in the image.

Each defect pair 112 has two seed defects (also referred to herein as "defect seeds"), one for each of the left and right eyes of a human visage. Each seed defect has a single pixel or a group of two or more contiguous pixels. For convenience, the following discussion is generally limited to embodiments, in which defect seeds each have a single pixel. Like considerations apply to multiple-pixel seed defects. It will be apparent to those of skill in the art that pixels of multiple-pixel seed defects can be manipulated as a group relative to a centroid or the like, in place of similar operations performed on a single-pixel seed defect.

The two seed defects are non-adjacent within the image. It is currently preferred that the two seed defects have a closest separation of 3-5 pixels or greater. The invention is not beneficial for human images having lesser seed defect separations.

Each seed defect of the defect pair 112 can be a list of pixels ((x,y) coordinate locations effected by the redeye defect). Pixel color values can optionally be provided for the listed pixels. The defect pair 112 can, alternatively, be an image map, in which pixels determined by the redeye defect detector 110 to be effected by redeye defect are assigned a different value than other pixels.

In addition to one or more defect pairs, the redeye defect detector 110 outputs a scale factor S for each defect pair and a detected redeye size $R_S$ for each seed defect. The scale factor S is the proportionate resizing of the digital image 102 performed by the redeye defect detector 110 during its analysis. The detected redeye size $R_S$ is a measure of the size of a respective seed defect as determined by the redeye defect detector 110 on the analysis of the resized digital image. $R_S$ is conveniently measured as the number of pixels in a seed defect, which represents the number of pixels of a left or right eye effected by the redeye defect. The scale factor S and the redeye size $R_S$ (also referred to as "other information 113") are output from the redeye defect detector and input to the defect corrector 114. As supplied to the defect corrector 114, each scale factor S is associated with a respective defect pair and each redeye size $R_S$ is associated with a respective seed defect.

The defect pair 112 and other information 113 are input to the defect corrector 114, along with the digital image 102. The defect corrector 114 determines pixels in the digital image 102 to modify, based on the defect pair 112. The defect corrector 114 modifies the colors of the determined pixels to reduce the visibility of the redeye defect and outputs an improved digital image 120.

Figure 3:
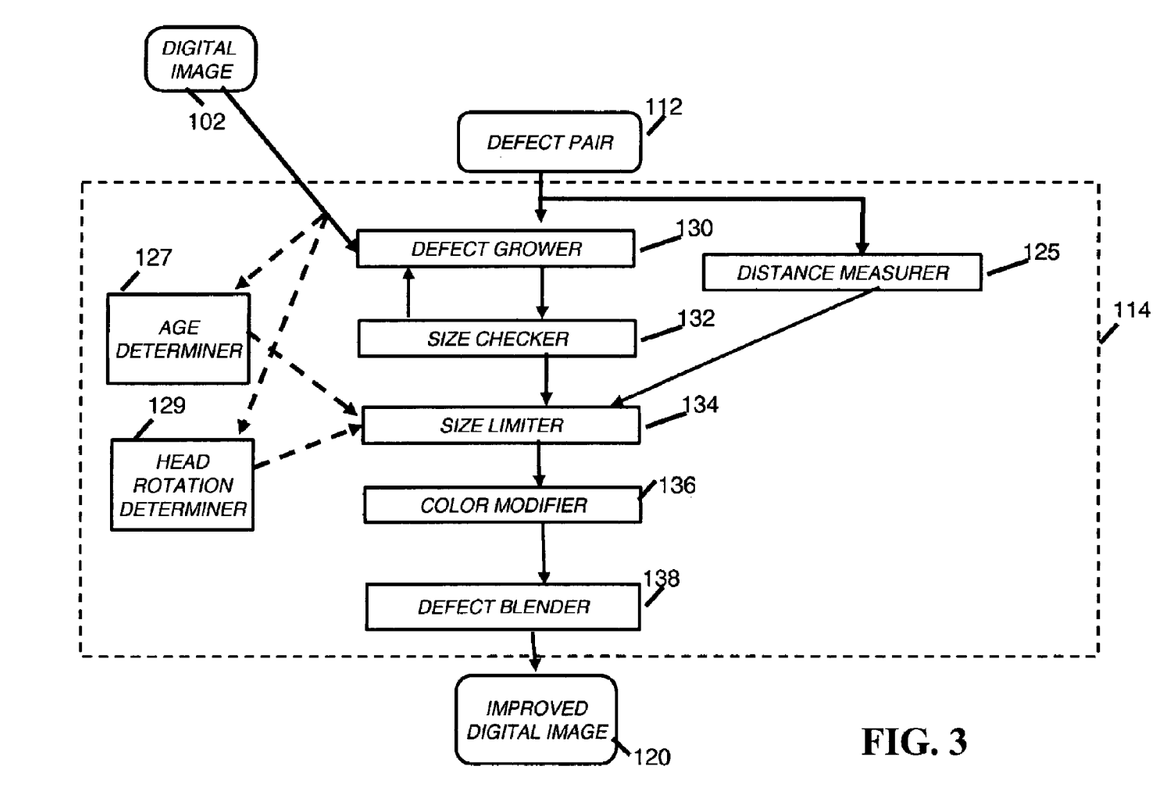
FIG. 3 is a partial, more detailed elaboration of the block diagram of FIG. 2.

FIG. 3 shows the defect corrector 114 in more detail. The defect corrector 114 includes components: 125, 127, 129, 130, 132, 134, 136, 138, which are discussed separately below. The defect location pair 112 and the digital image 102 are input to the defect grower 130. The purpose of the defect grower 130 is to find all pixels of the digital image 102 associated with each defect, using the defect position as a starting location.

The following procedure is used to grow a defect from a seed defect resulting in a grown defect. The locations of the pixel or pixels of the seed defect are first placed in a list of defect members (that is, a list of each pixel belonging to the defect). Then, the following steps are executed and repeated until a completion requirement is met:

1. The set of all pixels neighboring the current pixels of the defect member list is determined.

2. Within the set of neighboring pixels, a subset of possibly defective pixels is then determined. If the subset is empty, then a completion requirement is met and growing is complete.
3. A color value ratio is calculated for each possibly defective pixel. If color value ratios for all of the possibly defective pixels are within a predetermined limit ratio, then a completion requirement is met and growing is complete.
4. If one or more color value ratios are beyond the limit ratio, then the pixel having a color value ratio most distant from the limit ratio is added to the defect member list.
5. The defect member list is then checked against a predetermined area size limit. If the area size limit is met or exceeded, then completion is achieved and growing is complete.
6. Steps 1-5 are repeated until completion is reached.

In step 1 and elsewhere herein, pixels are considered to be neighboring if there is contact at edges or corners or both. In step 2, the subset of possibly defective pixels can be defined as all neighboring pixels or those neighboring pixels not meeting a criteria such as a condition on pixel color, but is preferably those neighboring pixels having a non-zero probability of being a redeye defect pixel. This condition can be expressed as:

$$Pr(redeye|color) > 0$$

The probability function Pr can be determined heuristically in a training stage, by analyzing many images and manually labeling known redeye and non-redeye pixels. If no neighboring pixels have a non-zero probability, then growing is complete.

In step 3, the calculated color value ratio is a measure of each possibly defective pixel in the same color space as other pixels of the respective human face. In a particular embodiment, the numerator of the color value ratio is the distance between the pixel's color value and the color value of the initial defect position. The denominator of that color value ratio is the distance between the pixel's color value and the average color value of the skin region. If no pixel has an associated ratio less than a predetermined limit ratio, $T_0$, then the growing is complete. This ratio is especially important for distinguishing between redeye pixels and skin pixels, both of which are reddish in color and appear in the area around the eye of an image affected by redeye. A convenient predetermined limit ratio is $T_0$=0.5. This threshold $T_0$ may be dependent on the color space representation of the digital image 102. In step 4, with this predetermined limit ratio, if pixels have color value ratios less than 0.5, then the pixel with the smallest color value ratio is added to the defect member list.

In step 5, if the area size limit, $A_0$, is met or exceeded, then growing is complete. The area size limit, $A_0$, is conveniently expressed in numbers of pixels. In this case, if the number of members in the member list is at least as large as $A_0$, then growing is complete. The area size limit, $A_0$, can be is a function of distance between the two grown defects of the defect pair 112. The distance is measured by the distance measurer 125 and is described in more detail below. It is currently preferred that the area size limit is expressed by the formula:

$$A_0 = K R_D^2$$

where K is 0.1. $R_D$ is the distance between the defects of the defect pair 112, measured in pixels.

The defect grower 130 outputs the grown defects. The output can be in the form of an image map or maps, in which pixels determined by the defect grower 130 to be affected by a redeye defect are assigned a different value than other pixels. A grown defect can also be output as a list of pixels ((x,y) coordinate locations) determined by the defect grower 130 to be affected by the redeye defect. Pixel color values can be provided in the list, if desired. A grown defect can, alternatively, be presented as a table of pixels and associated belief values that each pixel is affected by redeye defect. For example, belief values can be probabilities ranging from 0 to 100% that a particular pixel is affected by redeye defect.

The size checker 132 measures the grown defect size Q and determines if Q meets or exceeds a grown size limit. In a particular embodiment, the size checker 132 checks the size of the grown defect against the expected size of the actual defect in the image. A partial correction or under-correction can reasonably be predicted when the grown defect is much smaller than the expected defect size. A partial correction results in an image with only a portion a pupil having redeye defect, or if severe enough, results in an image that appears uncorrected. The size checker 132 causes the growing procedure of the defect grower 130 to be repeated when an objectionable partial correction is possible.

In a particular embodiment, the size checker 132 inputs the grown defect and the other information 113 and computes an expected size for the grown defect based on the resize factor S and the size of the seed defect $R_S$ found by the redeye defect detector 110 on the scaled digital image. The expected defect size can be computed as follows:

$$E_S = S^2 R_S$$

where:
$E_S$ is the expected size of the defect;
S is the scale factor used by the redeye defect detector 110;
$R_S$ is the size of the seed defect.

The number of pixels is a convenient unit for Q, $E_S$, and $R_S$. If Q<½ $E_S$ the grown defect is unacceptable and could represent an under-correction. Otherwise, the grown defect is considered acceptable by the size checker 132.

The expected size of the defect can be calculated in alternative ways, such as an expected area of the defect, an expected shape of the defect, or an expected radius of the defect. For example, if the method is applied to a population of images in which the scaling factor is constant, then $E_S$ can be set to an empirically determined constant. Similarly, the relation Q<½ $E_S$ can be varied to meet particular requirements. For example, if $E_S$ represents a radius of the expected defect, then a similar relation is $$Q < 0.707 E_S$$

where Q and $E_S$ have the same meanings as presented above.

If the size checker 132 determines that the grown defect is unacceptable, then the seed defect is altered, shifting its location of other initial conditions in the image and resulting in what is referred to hereafter as a modified defect. The defect grower 130 is applied to the modified defect. Since initial conditions are slightly different, the resulting grown defect differs from the grown defect initially produced.

In a particular embodiment, the modified defect is a new seed defect having a new pixel location. With a single-pixel seed defect, the new seed defect is determined by finding the most saturated red pixel within a small neighborhood of the original single pixel seed defect. An example of a suitable small neighborhood is within a distance of 5 pixels or a small fraction of the defect pair separation $R_D$ from the original single pixel seed defect. ($R_D$ is discussed below in detail.) The new seed defect can, alternatively, be determined in other ways. For example, the new seed defect can be selected by finding the pixel having a color value most like the mean value of all red pixels within a small neighborhood, as discussed above, of the original seed value. These procedures are applied to multiple-pixel seed defects in a like manner, by defining the neighborhood relative to all of the pixels of the defect or relative to a centroid or a pixel at the centroid of the multiple-pixel seed defect.

The defect grower 130 restarts the growing process with new seed defect locations until the size checker 132 determines that the grown defect is acceptable or, optionally, until a certain number of iterations is reached. A convenient number of iterations is four. If the limit on the number of iterations is met, then the grown defect is reset to equal the first grown defect (which was earlier found to be unacceptable). Alternatively, the defect pair 112 can be ignored (no correction applied) when the size checker 132 continues to determine that the grown defect is unacceptable and the allowed number of iterations is exhausted. This prevents the possibility of an unacceptable correction being applied to the image. In a further alternative, a human operator can be notified to provide assistance in a manual mode for assisting the algorithm to ensure that the grown defect is correct.

The distance measurer 125 measures the distance between the members of the defect pair. This defect pair separation $R_D$ is used to prevent overcorrections by the grown defects. The defect pair separation can be calculated at different stages of the method. Pixels are convenient units of measurement.

In a particular embodiment, having a defect pair with a pair of single pixel seed defects, the values are:

left seed defect: $(x_1, y_1)$ right seed defect: $(x_2, y_2)$

The distance measurer 125 measures the distance between the pair of single-pixel seed defects using the well-known distance formula:

$$R_D = \sqrt{(x_1-x_2)^2+(y_1-y_2)^2}$$

If the seed defects have more than one pixel, the defect pair separation $R_D$ is the separation between the centroids of the seed defects. The defect pair separation can also be based on the separation of a seed defect and a centroid of the other member of the defect pair. Alternatively, the defect pair separation can also be calculated in the same manner for a defect pair having a pair of grown defects, but this approach is subject to the effects of the defect growing procedure.

The size limiter 134 inputs a grown defect and the respective defect pair separation and adjusts the grown defect responsive to the defect pair separation. The adjustment is either a retaining of the grown defect unchanged or a trimming, that is, a reduction in the size of the grown defect. The size limiter 134 determines pixels of the grown defect to exclude to prevent over-corrections and outputs an adjusted defect.

The size limiter 134 is effective because the ratio between pupil radius size and distance between the eyes has a relatively narrow distribution. When more information is available a correction factor can be applied, such that the distribution can be further narrowed, improving the effectiveness of the size limiter 134. The correction factor is corrects for differences based upon: an age classification, a head rotation, imaging system blur, or a combination of two or more of these (discussed below in detail).

The size limiter 134 adjusts the grown defect in two stages. Each stage has a size limit based on the observation that for a human face, the pupil size (and consequently the size of a redeye defect) is related to the distance between the eyes. If, in fact, the defect pair 112 describes the position of a left and right defect, then the distance $R_D$ is approximately the distance between the eyes, measured in pixels on the image, of the human subject.

In the first stage, the size limiter 134 removes pixels from the grown defect having a distance to the seed exceeding a first size limit $S_{L1}$. The size limiter 134 computes the first size limit $S_{L1}$ from the distance $R_D$ between the redeye defects. The first size limit can be computed as follows:

$$S_{L1} = R_D * T_1 + T_2$$

where $S_{L1}$ is the first size limit;
$R_D$ is the defect pair separation;
$T_1$ is a constant between 0.12 and 0.20; and
$T_2$ is a constant between 0.0 and 3.0.

$T_1$ is related to the maximum diameter of a pupil divided by the distance between human pupils and can be determined by measuring the pupil sizes and separation distances for many people and finding the maximum and an average or median distance between human pupils. $T_2$ is related to providing a sufficient "safety margin" so that the first size limit $S_{L1}$ will not damage the defects by trimming too aggressively, if the distance $R_D$ is erroneously low. A convenient value of $T_1$ is 0.18. A convenient value of $T_2$ is 0.

Figure 4:
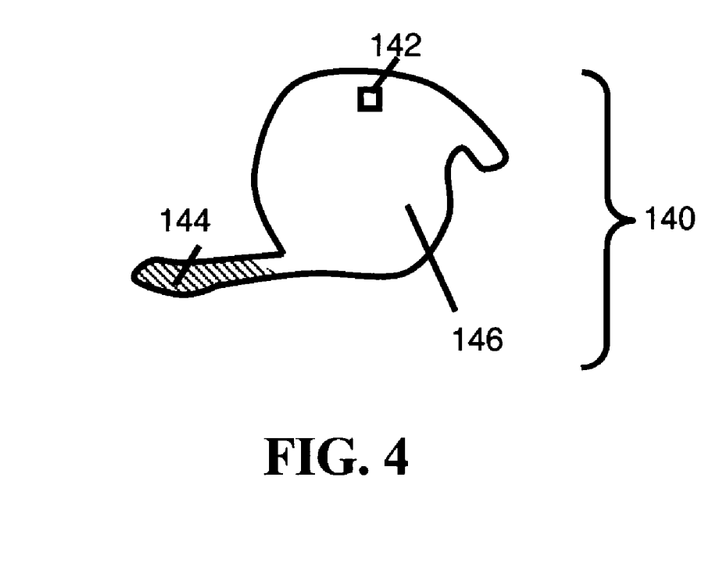
FIG. 4 is semi-diagrammatical view of an example of a grown defect. Pixels to be removed at the first adjustment stage are indicated by cross-hatching.

Next, for each pixel of the grown defect, the first adjustment distance $D_S$ between that pixel and the seed pixel is calculated with the well-known distance formula. If the first adjustment distance $D_S$ exceeds $S_{L1}$, then the pixel is removed from the grown defect. Otherwise the pixel remains in the grown defect. FIG. 4 illustrates a grown defect 140, its seed defect 142, pixels 144 that would be removed from the grown defect at the first stage, because the respective $D_S$ exceeds $S_{L1}$, and an example of pixels 146 that would not be removed, because the respective $D_S$ does not exceed $S_{L1}$.

Figure 5:
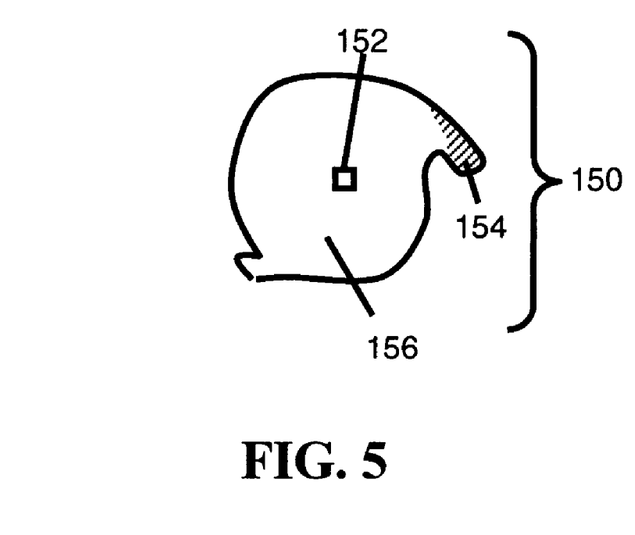
FIG. 5 is the same view as FIG. 4, but following completion of the first adjustment stage. Pixels to be removed at the second adjustment stage are indicated by cross-hatching.

In the second stage, the size limiter 134 removes pixels from the defect region having a distance to the defect region's centroid 152, shown in FIG. 5, exceeding a second size limit. The location of the defect region centroid $[x_c, y_c]$ is calculated as:

$$[x_c, y_c] = \left[ \frac{\sum_{i=0}^{Q-1} x_i}{Q}, \frac{\sum_{i=0}^{Q-1} y_i}{Q} \right]$$

where

Q is the number of pixels currently in the grown defect; and
$(x_i, y_i)$ is the coordinate position of the $i^{th}$ pixel belonging to the grown defect.

For each pixel of the grown defect, the second adjustment distance $D_C$ between that pixel and the centroid $(x_c, y_c)$ is calculated with the well-known distance formula.

The second size limit is computed as follows:

$$S_{L2} = R_D * T_3 + T_4$$

where $S_{L2}$ is the second size limit;
$R_D$ is the defect pair separation; and $T_3$ is a constant between 0.05 and 0.10; and $T_4$ is a constant between 0.0 and 3.0.

$T_3$ is a heuristically determined maximum radius of a large redeye defect divided by a standard distance between human pupils. By extracting measurements from a large number of images, it has been found that for sufficiently large images of (front-on) faces, the radius of a pupil does not exceed 0.072 times the distance between the eye pupils. In fact, usually the distance is smaller due to the fact that usually the pupils are not dilated to the maximum possible state. For a population of images having unknown presentations of human faces, a convenient value of $T_3$ is 0.072.

$T_4$ is the blur of the imaging system used to capture the digital image 102. For small faces, the distance of defective pixels affected by redeye can be greater than $0.072*R_D$ due to the fact the blurring or defocus in the optical system effectively spreads the redeye effect onto pixels in the vicinity of the pupil. In calculating the second size limit, the blurring amount is represented by constant $T_4$. Blur is conveniently expressed as a blurring radius for the imaging system expressed in units of pixels of a blurring radius. If the actual blurring radius is known for the imaging system that captured the image, it can be substituted for $T_4$. For an unknown imaging system, a convenient value of $T_4$ is 2.0.

If the second adjustment distance $D_C$ exceeds $S_{L2}$, then the pixel is removed from the grown defect, otherwise the pixel is not removed. FIG. 5 illustrates a partially adjusted grown defect 150, corresponding to the grown defect of FIG. 4 following the completion of the first stage. The partially adjusted grown defect 150 has a seed defect 152, pixels 154 to be removed, because $D_C$ exceeds $S_{L2}$, and pixels 156 to be retained, because $D_C$ does not exceed $S_{L2}$. The order of the first and second adjustment stages can be switched, that is the adjustment based on the grown defect's centroid can precede the adjustment based on the grown defect's seed defect location; however, it has been determined empirically that the described order provides a higher quality correction.

The defect pair separation $R_D$ may be disproportionate to the actual separation of the human subject's eyes due to rotation of the subject's head relative to the image plane of the camera. (Note that while head rotation affects the distance between a defect pair $R_D$ it does not necessarily affect the size of the redeye defects in an image of the head because the eyes can rotate somewhat independently from the head and may still be looking directly at the camera.) The defect pair separation $R_D$ is proportional to actual eye separation when the subject is front-on to the camera, that is, when a line connecting the subject's eyes is parallel to the image plane. With images of rotated eyes, the defect pair separation $R_D$ can be replaced in the above formulas with a modified separation distance $R_M$ that is invariant to head rotation about an internal vertical axis. $R_M$ is expressed by the formula:

$$R_M = \frac{R_D}{\cos A}$$

where $R_M$ and $R_D$ are as above indicated and the rotation angle A is the smallest angle between an imaginary line connecting the human subject's eyes and the image plane. The rotation angle A is the angle of head rotation about a vertical axis passing through the top to the bottom of the head. For example, when the subject is looking straight on to the camera, the angle A is 0. When the image is a profile of the left side of the face, the angle A is p/2 radians.

Head pose (and angle A) can be derived through automatic analysis of an image. An example of such a procedure is disclosed in "Estimating Facial Pose Using the EM Algorithm", K. Choi et al., Ninth British Machine Vision Conference, [online], 1998 [retrieved on 2004-03-01]. Retrieved from the Internet: URL:

http://www.bmva.ac.uklbmvc/1998/pdf/p147.pdf

Choi et al. describe estimating 3D facial pose by using 2D projections of 3D templates fitted to the 2D feature positions. The process involves projecting control points of the 3D template to 2D with a set of Euler rotations and orthographic projection. The projected control points are examined in light of the 2D feature positions to arrive at an updated estimate for the Euler rotations. The process iterates to arrive at a final set of Euler rotations describing the 3D facial pose.

The head rotation determiner 129 analyzes the image of the human subject's face corresponding to the defect pair, and outputs an angle A of in-plane rotation that is input to the size limiter 134 to be used to determine the value of the second size limit $S_{L2}$. For example, a rotation-independent second size limit $S_{L2}'$ can be calculated using the knowledge of the head rotation as:

$$S_{L2}' = \frac{T_3 R_D}{\cos A} + T_4$$

Where:

$S_{L2}'$ is the rotation-independent second size limit

A is the angle of head rotation about a vertical axis passing from the top to the bottom of the head; and $R_D$, $T_3$, and $T_4$ have the meanings above discussed.

As a further alternative, it has been observed that the ratio of pupil radius to distance between the eyes is highly dependent on the age of the human subject. For babies and small children, the ratio (ignoring blur) can achieve a maximum of about 0.072 when the subject is photographed straight-on and has maximally dilated pupils. With adults, the ratio achieves a maximum value of about 0.05. Therefore, in order to further improve the second size limit, the age of the human subject is determined, possibly as a coarse category classification (e.g. baby, child, teen, adult). Then the value of $T_3$ that is used to determine the second size limit $S_{L2}$ is selected based on the age categorization. For example, if the human subject is classified as a baby, then $T_3=0.072$. However, if the subject is classified as an adult, then $T_3=0.05$. U.S. Pat. No. 5,781,650, to Lobo et al., hereby incorporated herein by reference, describes an automatic method of performing age classification of human faces. The optional age determiner 127 analyzes the image of the human subjects face corresponding to the defect pair, and outputs an age classification that is input to the size limiter 134 to be used to determine the value of the second size limit $S_{L2}$.

In a particular embodiment, information including the distance between the redeye defect positions, the head rotation angle, age classification, and blur amount in the optical system that captured the image are all used to effectively create the size limits.

The adjusted defect is input to the color modifier 136 for modification of the color of the digital image pixels that are included in the adjusted defect to reduce redeye. The output of the color modifier 136, after modification of all adjusted defects, is a color modified image p(x,y) with corrected redeye defects, in which human pupils appears black rather than red. A variety of techniques for modifying detected redeye pixels are known to those of skill in the art.

In a particular embodiment, the colors of the pixels of the adjusted defects are corrected by replacement with the color component having the least sensitivity to red light. A color image includes one or more color component values (or channels) of color information. Common digital cameras produce original digital images 102 having red, green and blue color components, that is, there are red $p_R(x,y)$, green $p_G(x,y)$, and blue $p_B(x,y)$ component values for each pixel position in the image $p(x,y)$. In this case, the color component with the least sensitivity to red light is the blue component.

The replacing looks to the value of the least red color component, that is, the value of the color component of the digital image having the least red spectral sensitivity is determined. The term "spectral sensitivity" as used herein, refers to the possible responsiveness of a color component (channel) to a monochromatic stimuli. For example, with RGB color components of a digital image, the red color component has the greatest spectral sensitivity to a monochromatic red stimuli. Likewise, the blue color component has the least spectral sensitivity to a monochromatic red stimuli. Spectral sensitivity is a function of the imaging system used to prepare a digital image, including transformations between different color spaces. For color reproduction, spectral sensitivity of applicable color components is necessarily known or assigned by default.

When the color component with the least sensitivity to red light is the blue component, then the correction is as follows. For each pixel in the modified defect, the color is modified by replacing the values of every color component with that of the blue color component value. The color modification of pixels included in the modified defect for digital images having red, green and blue color components can be described as:

$$p_R(x,y) = p_B(x,y)$$

$$p_G(x,y) = p_B(x,y)$$

The blue color component does not need to be modified and the glint of the eye can be treated with the same correction technique as the redeye pixels, thus this correction has the advantage that it is very fast.

The described method of using the blue color component to correct the red and green color components of the redeye pixels not only empirically provides a redeye defect correction that is preferred over other methods, but it can be justified through data analysis.

The pixel values of a large number of images of human pupils were examined. The pupils were classified as either "redeye pupils" if the pupils appeared to be a redeye defect or as a "non-redeye pupils" when the pupils did not appear to be a redeye defect. On average, the red color component of the redeye pixels received 95% more exposure than the red color component of the non-redeye pixels. The green color component of the redeye pixels received 36% more exposure than the green color component of the non-redeye pixels; however, the blue color component of the redeye pixels received only 22% more exposure than the blue color component of the non-redeye pixels. In general, a redeye defect is more likely to occur when the flash exposure on the subject in increased. Thus the data analysis shows that using the blue color component as the basis for correcting the other color components is a reasonable procedure.

Alternative corrections based on the blue color component can also be used by the color modifier 136, such as:

$$p_R(x,y) = p_B(x,y) + T_5$$

$$p_G(x,y) = p_B(x,y) + T_5$$

$$p_B(x,y) = p_B(x,y) + T_5$$

where $T_5$ is a constant useful for adjusting the desired lightness of corrected redeye defects. For example, the value of $T_5$ can range from 0 to −20 depending on the desired lightness of the corrected redeye and on the color space representation of the digital image 102.

The color modifier 136 can, alternatively, apply a correction based on the color characteristics of neighboring skin regions. It has been determined through study of images of human faces without the redeye defect (i.e. the image of the human pupils appear black) that there exists a relationship between skin lightness and pupil lightness. For example, when imaging a human without redeye, an average pixel representing a pupil receives only 11% of the light exposure (an exposure reduction of 3.19 stops) compared to a flesh pixel from the same face (considering the green component of an RGB image). This relationship was learned from an analysis of the flesh color and pupil color in images of humans without redeye defect.

In a particular embodiment, the color modifier 136 computes a target pupil value V based on the average flesh color of the skin region associated with the defect pair 112. The target pupil value V is then substituted for all color components of all pixels of the modified defect by the color modifier 136. As an example, in the 8 bit per color component per pixel sRGB color space, the target pupil value can be determined with the following equation:

$$V = 255\left(1 - \left(1 - \frac{F_a}{255}\right)^{2.065^{-3.19}}\right)$$

where:

$F_a$ is the average value of the green component for the skin region containing the defects.

For example, if the average flesh value is 150, the target pupil value V is 21. A scene exposure value that renders to an sRGB code value of 21 is about 3.19 stops below the scene exposure value that renders to an sRGB code value of 150 in some digital cameras, such as the DX7630 digital camera, which is marketed by Eastman Kodak Company of Rochester, N.Y.

The color modifier 136 then modifies the color of the pixels of the modified defect according to the equations:

$$p_R(x,y) = V$$

$$p_G(x,y) = V$$

$$p_B(x,y) = V$$

The color modified digital image output from the color modifier 136 is input to the defect blender 138, which reduces the visibility of the border between the defect pixels and the border pixels. A spatial operator is computed.

Preferably, the spatial operator is an N×N filter. To preserve phase, N must be odd. The size N is determined based on the size of the modified defect. It is convenient to set N=5, unless the adjusted defect includes fewer than 28 pixels, in which case, N=3. Using a smaller spatial operator to blend a smaller adjusted defect prevents excessive blurring that can lead to an objectionable appearance of a human subject's eyes.

An alternative spatial operator has a circular region of support, rather than a square region.

In a particular embodiment, the spatial operator is a symmetric lowpass filter. The relative magnitudes of the coefficients of the spatial operator F(i,j) are:

$$F(i, j) = [N - |i| - |j|]^2 \text{ for } |i|, |j| \le \frac{N-1}{2} = D$$

Filter F(i,j) is then normalized such that the sum of all coefficients is 1.0.

This defect blender 138 operates as follows. For each pixel, a local N×N neighborhood is examined. The number of pixels P belonging to the adjusted defect within the local neighborhood is tabulated. The number P can range between 0 and $N^2$, inclusive. When the number P is either zero (no pixels belong to the adjusted defect) or $N^2$ (all pixels in the local neighborhood belong to the adjusted defect) the pixel is left unchanged. Otherwise, for each color channel that was modified by the color modifier 136 (in a particular embodiment discussed above, the blue color component is not modified by the color modifier 136 and therefore is not modified by the defect blender 138), a blurred pixel value $B_C(x,y)$ is calculated by convolution as follows:

$$B_C(x, y) = \sum_{m=-D}^{m=D} \sum_{n=-D}^{n=D} p_C(x - m, y - n) * F(m, n)$$

The blurred pixel value is:

$$I_c(x,y) = (1-W)p_c(x,y) + W B_C(x,y)$$

where
W is from 0 to 1.

W is a weight related to the aforementioned number of pixels P in the local N×N neighborhood belonging to the modified defect. A currently preferred weight W is:

$$W = 1 - 2\left|\frac{P}{N^2} - \frac{1}{2}\right|$$

W is maximized when the local neighborhood is centered on the border between pixels belonging to modified defect and non-defect pixels in the image.

The improved pixel values are substituted into the color modified image, producing the output improved digital image 120. The improved digital image 120 has been improved by modifying redeye affected pixels, producing an image with naturally appearing human pupils.

The method of the present invention can be performed in a digital camera, a digital printer, or on a personal computer.

The invention has been described in detail with particular reference to certain preferred embodiments thereof, but it will be understood that variations and modifications can be effected within the spirit and scope of the invention.

The invention claimed is:

1. A method of correcting redeye in a digital image having at least one redeye defect pair, said method comprising the steps of:
   measuring a redeye defect pair separation;
   ascertaining an age classification and a head rotation of each said redeye defect pair;
   determining a size limit based on said redeye defect pair separation and upon an imaging system blur associated with said image, and further based upon the ascertained age classification or head rotation of each said redeye defect pair;
   adjusting a size of defects of said redeye defect pair responsive to the size limit to provide adjusted defects; and
   changing a color of said adjusted defects,
   wherein the measuring step, the ascertaining step, the determining step, the adjusting step, and the changing step are carried out with a digital image processor.

2. The method of claim 1, wherein the adjusting step further comprises reducing the size of at least one of said defects of said defect pair.

3. The method of claim 2, wherein the reducing step further comprises trimming pixels beyond said size limit from said defects.

4. The method of claim 1, further comprising the steps of:
   detecting locations of a pair of seed defects prior to the measuring step; and
   growing said seed defects into grown defects prior to the adjusting step,
   wherein the adjusting step further comprises reducing the size of said grown defects.

5. The method of claim 4, wherein the measuring step is executed before the growing step.

6. The method of claim 4, wherein said seed defects each have a single pixel before the growing step.

7. The method of claim 1, further comprising the steps of:
   determining a spatial operator in accordance with said defect pair separation; and
   using said spatial operator to blend the image in a vicinity of said adjusted defects.

8. A method of correcting redeye in a digital image, said method comprising the steps of:
   detecting a pair of redeye seed defects in said image;
   growing each of said redeye seed defects to provide a pair of grown defects;
   measuring a separation of the members of one of said pair of redeye seed defects and said pair of grown defects to provide a defect pair separation;
   ascertaining an age classification and a head rotation of each said redeye defect pair;
   determining a size limit based on said redeye defect pair separation and upon an imaging system blur associated with said image, and further based upon the ascertained age classification or head rotation of each said redeye defect pair;
   adjusting a size of said grown defects responsive to the size limit to provide adjusted defects; and
   changing a color of said adjusted defects to reduce apparent redeye,
   wherein the detecting step, the growing step, the measuring step, the ascertaining step, the determining step, the adjusting step, and the changing step are carried out with a digital image processor.

9. The method of claim 8, wherein the adjusting step further comprises reducing the size of said grown defects.

10. The method of claim 8, wherein said seed defects each have a single pixel.

11. The method of claim 9, wherein the reducing step further comprises trimming pixels beyond said size limit from respective said defects.

12. The method of claim 11, wherein said seed defects each have a single pixel and the reducing step further comprises trimming pixels of each said grown defect disposed farther than said size limit from a pixel location defined by a respective said seed defect.

13. The method of claim 11, wherein said seed defects each have multiple contiguous pixels and the reducing step further comprises trimming pixels of each said grown defect disposed farther than said size limit from a centroid defined by a respective said seed defect.

14. The method of claim 8, wherein the growing step further comprises:
generating a list of pixels of each said seed defect to provide list pixels;
determining pixels neighboring said list pixels to provide neighboring pixels;
calculating color value ratios of each of said neighboring pixels; and
adding to said list one of said neighboring pixels having the color value ratio most distant from a predetermined limit, when one or more of said neighboring pixels has a color value ratio greater than a predetermined limit.

15. The method of claim 8, further comprising the step of determining an eye separation correction factor, wherein the adjusting step is responsive to said defect pair separation and said separation correction factor.

16. A computer readable storage medium having a computer program stored thereon for performing a method of correcting redeye in a digital image having at least one redeye defect pair, the method comprising the steps of:
measuring a redeye defect pair separation;
ascertain an age classification and a head rotation of each said redeye defect pair;
determining a size limit based on said redeye defect pair separation and upon an imaging system blur associated with said image, and further based upon the ascertained age classification or head rotation of each said redeye defect pair;
adjusting a size of defects of said redeye defect pair responsive to the size limit to provide adjusted defects ; and
changing a color of said adjusted defects.

17. A system for correcting redeye in a digital image having at least one redeye defect pair, said system comprising:
measuring unit configured to measure a defect pair separation;
an ascertaining unit configured to ascertain an age classification and a head rotation of each said redeye defect pair;
a determining processor unit configured to determine a size limit based on said redeye defect pair separation and upon an imaging system blur associated with said image, and further based upon the ascertained age classification or head rotation of each said redeye defect pair;
an adjusting processor unit configured to adjust a size of defects of said redeye defect pair responsive to the size limit to provide adjusted defects; and
a color modifier unit configured to change a color of said adjusted defects.

* * * * *